(12) United States Patent
Ross et al.

(10) Patent No.: US 9,160,815 B2
(45) Date of Patent: Oct. 13, 2015

(54) METHOD AND APPARATUS FOR VIRTUAL MACHINE INTEROPERABILITY

(75) Inventors: Alan Ross, Shingle Springs, CA (US); Dennis Morgan, Pine Grove, CA (US); Manish Dave, Folsom, CA (US); Timothy Verrall, Pleasant Hill, CA (US); Tarun Viswanathan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 13/536,777

(22) Filed: Jun. 28, 2012

(65) Prior Publication Data

US 2014/0007086 A1    Jan. 2, 2014

(51) Int. Cl.
*G06F 9/455* (2006.01)
*H04L 29/06* (2006.01)
*H04L 29/08* (2006.01)

(52) U.S. Cl.
CPC ............ *H04L 67/38* (2013.01); *H04L 67/2823* (2013.01)

(58) Field of Classification Search
USPC .......................................................... 718/1
See application file for complete search history.

(56) References Cited

U.S. PATENT DOCUMENTS

| 2003/0126587 | A1 | 7/2003 | Rosner et al. |
| 2004/0031022 | A1 | 2/2004 | Kabasawa et al. |
| 2007/0038703 | A1* | 2/2007 | Tendjoukian et al. ........ 709/206 |
| 2008/0215793 | A1* | 9/2008 | Hashimoto et al. ............... 711/6 |
| 2012/0047501 | A1 | 2/2012 | Box et al. |

FOREIGN PATENT DOCUMENTS

WO    WO-2014004554 A1    1/2014

OTHER PUBLICATIONS

"International Application Serial No. PCT/US2013/047681, International Search Report mailed Aug. 29, 2013", 3 pgs.
"International Application Serial No. PCT/US2013/047681, Written Opinion mailed Aug. 29, 2013", 4 pgs.

* cited by examiner

*Primary Examiner* — Emerson Puente
*Assistant Examiner* — Steven Do
(74) *Attorney, Agent, or Firm* — Schwegman Lundberg & Woessner, P.A.

(57) ABSTRACT

This disclosure relates generally to a system and method for translating between virtual machines. A network adaptor can be configured to be communicatively coupled to a server, the server comprising a first virtual machine having a first format, the network adaptor to receive input from the server. A translator can be configured to identify, from the input from the server, the first format of the first virtual machine and generate an output, compatible with a second format of a second virtual machine, based on the input from the server, the second format being incompatible with the first format.

30 Claims, 4 Drawing Sheets

METHOD AND APPARATUS FOR VIRTUAL MACHINE INTEROPERABILITY

TECHNICAL FIELD

The disclosure herein relates generally to virtual machine translation.

BACKGROUND ART

Virtual machines create a guest operating system that operates over, alongside, or within an operating system of a host electronic device, such as a computer. The use of a virtual machine can provide a user of the host electronic device the capacity to interact with files and systems that are compatible with the virtual machine, but that may be incompatible with the host operating system. The virtual machine can operate as a software emulator, where the virtual machine mimics the functionality of the virtual operating system and provides hardware abstraction, e.g., virtual hardware, to create a simulated hardware environment on the host device. In some configurations, the virtual hardware can simulate hardware of a device remote to the host electronic device.

Companies such as VMware®, Inc., Citrix® Systems, Inc., and Microsoft® Corporation sell virtual machines for use on host devices. The virtual machines of the various companies can operate according to different, incompatible formats with respect to one another. Different virtual machine formats can incorporate different architectures and hosting environments, and can utilize different instruction sets. In addition, companies such as Microsoft® Corporation, Amazon.com®, Inc., and Google® Inc. have created public cloud services that can be accessed through the use of a virtual machine on a host device. Because virtual machines can be incompatible with respect to one another, a user who does not possess a virtual machine corresponding to one virtual machine format or cloud service format may not be capable of accessing data corresponding to another virtual machine or cloud service that does not correspond to the user's virtual machine.

DESCRIPTION OF THE EMBODIMENTS

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In an example, an entity, such as an individual computer user or a corporation, can utilize various online and virtual systems. The entity can utilize, for instance, a virtual cloud service to store information as well as another virtual cloud service for the production of documents. The entity can also utilize two or more different virtual machines to various pieces of software which are not compatible with the entity's native operating system.

Consequently, the example entity can utilize four virtual machine formats in everyday use; different entities can utilize more or fewer virtual machine formats. Information and documents in one virtual machine format may not be readable using software for another virtual machine format without translation. As a result, the entity can be locked into separately managing all of the different virtual machine formats. If software for one virtual machine format becomes unavailable for any reason, the entity may be unable to utilize information provided in that virtual machine format.

Virtual machine translation, as disclosed below, can allow various virtual machine formats to be useable on software for a different virtual machine format. Thus, the entity may not need to maintain software for each virtual machine format, and, in the event that software for a virtual machine format becomes unavailable, the entity can shift to software for another format and allow the virtual machine translator to translate the various formats into the new format for use and manipulation. Such translation can be performed dynamically, advantageously allowing the entity to shift among different virtual machine software environments or architectures while maintaining use of some or all of the various virtual machine formats.

Figure 1:
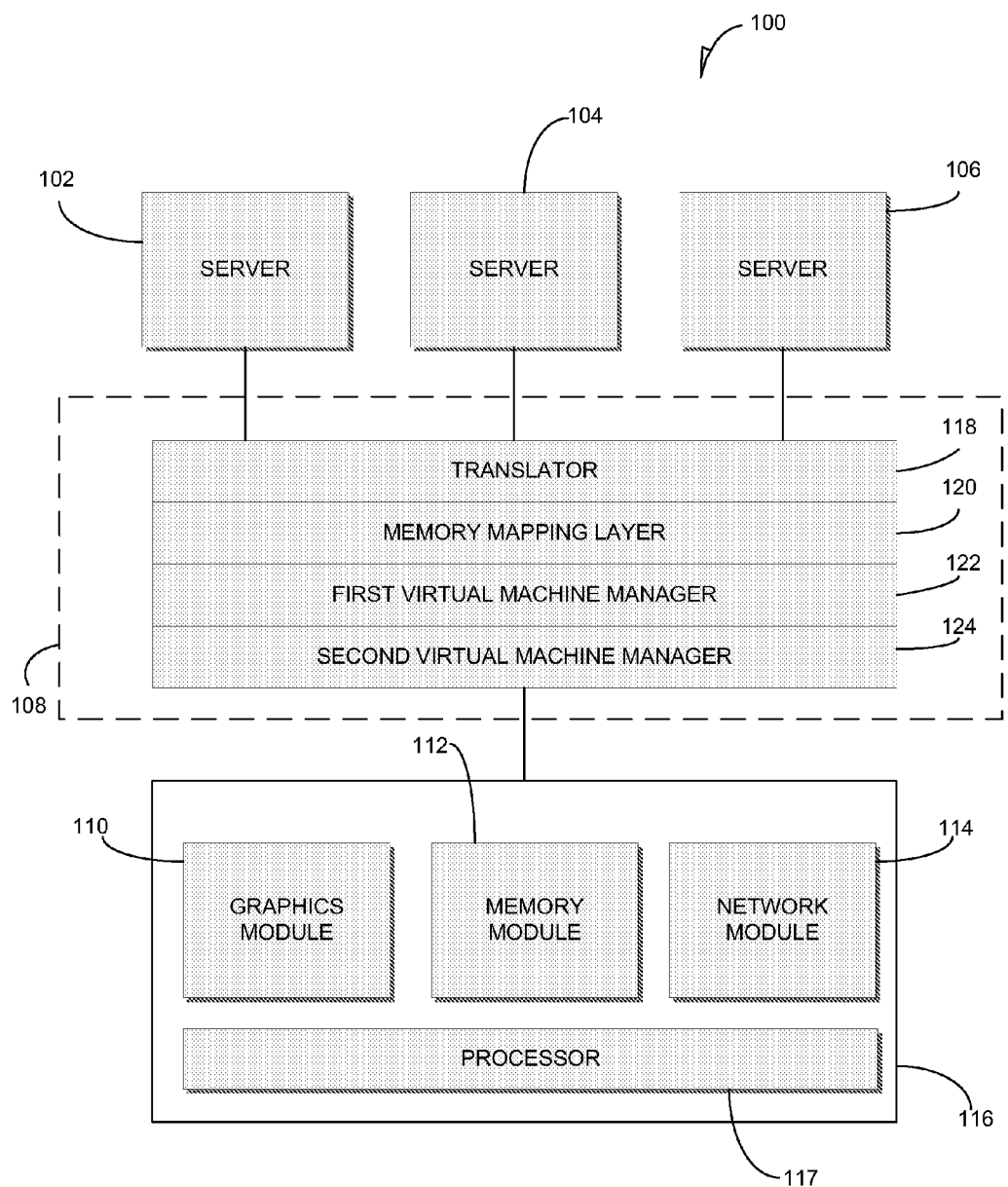
FIG. 1 is a block diagram of a system with multiple virtual machines, according to an embodiment.

FIG. 1 is a block diagram of a system 100 with multiple virtual machines, in an embodiment. The system 100 includes servers 102, 104, 106, a virtual machine manager block 108, and computer functionality, including a graphics module 110, a memory module 112, and a network module 114. The modules 110, 112, and 114 can be incorporated as a single electronic device 116, such as, but not limited to, a computer, a smartphone, and a personal digital assistant. The electronic device 116 can include a processor 117 and other hardware. The modules 110, 112, and 114 can be coupled to the processor 117, and the processor 117 can control or contribute to the operation of the modules 110, 112, and 114.

The graphics module 110 can include a display and/or display drivers and can further include a user interface to allow a user to interact with the electronic device 116. The memory module 112 can be a readable and writable memory module and can include volatile memory, such as random access memory (RAM), as well as non-volatile memory, such as programmable read-only memory (PROM), flash memory, or a hard disk. The memory module 112 can contrast, for instance, with processor-based cache and other processor-based memory, in that the memory module 112 can potentially be read and written to by sources other than a dedicated processor. The network module 114 can include a network adapter for conventional wired and wireless networking technologies.

In an example, the virtual machine manger block 108 can be a component of the electronic device 116. The virtual machine manager block 108 can operate on dedicated hardware, such as custom-designed hardware, or can operate as part of or be controlled by the processor 117 of the electronic device 116. In a further example, the virtual machine manager block 108 can operate on a dedicated server coupled between the electronic device 116 and the servers 102, 104, and 106. The virtual machine manager block 108 can incorporate instantiated layers, including a translator 118, a memory mapping layer 120, a first virtual machine manager 122 and, optionally, a second virtual machine manager 124. The first virtual machine manager 122 can incorporate or control the translator 118 and/or the memory mapping layer 120. In an example, the virtual machine manager block 108 can provide or contribute general computing capabilities and services to various end-users, known as "cloud computing" in the art. In an example where the virtual machine manager block 108 is a component of a separate server, the virtual machine manager block 108 can communicate with multiple additional modules 110, 112, 114 and/or electronic devices 116.

According to an embodiment, in FIG. 1, the first server 102 implements a first virtual machine that operates according to a first format; the second server 104 implements a second virtual machine that operates according to a second format; and the third server 106 implements a third virtual machine that operates according to a third format. In an example embodiment, the first virtual machine can be a virtual machine utilizing a VMware® virtual machine format, the second virtual machine can be a virtual machine utilizing a Citrix® virtual machine format, and the third virtual machine can be a virtual machine utilizing a Microsoft® Hyper-V™ virtual machine format. A format for a virtual machine can be understood as architectural and defined, at least in part, by at least some of the instructions, subroutines, function calls, hardware interactions, and so forth with which the virtual machine provides the virtual environment to the host device, such as the electronic device 116. In various embodiments, more than one virtual machine can be implemented according to each format. Under such circumstances, each instruction related to and data provided by each virtual machine of the same format can communicate with each other virtual machine of the same format without translation between the virtual machines. In various examples, virtual machines of different formats are unable to communicate with respect to one another without translation. Any one server 102, 104, 106 can implement one or more of a plurality of virtual machines not limited in number to the three specific virtual machines illustrated. Any one virtual machine can be implemented on more than one server 102, 104, 106.

The virtual machine manager block 108 can be configured to provide the various virtual machines for use to the electronic device 116, generally, or to the modules 110, 112, 114 individually. The virtual machine manager block 108 can provide the various virtual machines without the electronic device 116 being separately configured to operate each virtual machine, such as by being loaded with the software utilized to run each virtual machine separately and directly from the virtual machine's host server 102, 104, 106. In an example, the electronic device 116 conducts all interaction with the virtual machines and the virtual machines' host servers 102, 104, 106 by way of the virtual machine manager block 108.

Profiles

The virtual machine manager block 108 can incorporate profiles of various virtual machines. The profiles can include those of the virtual machines implemented on the servers 102, 104, 106. Each profile can include a list or documentation of an instruction set of the related virtual machine, such as processes (e.g., particular programs run by the virtual machine), subroutine or function calls (e.g., which functions the virtual machine utilizes during implementation), and hardware interactions (e.g., what hardware of the host device the virtual machine utilizes during implementation) of the corresponding virtual machine format. Each profile can incorporate a complete documentation of the processes, function calls, and hardware interactions for the corresponding virtual machine, or can incorporate a subset of such processes, function calls, and hardware interactions.

The profiles can be obtained using a profiler, such as VTune (VTune is a trademark of Intel® Corporation) and Simics (Simics is a trademark of Wind River Systems, Incorporated.) that can operate as part of the virtual machine manager block 108, such as by operating on the first virtual machine manager 122. In an alternative example, the profiler operates separate from the virtual machine manager block 108. In such an example, the profiler provides profiles to the virtual machine manager block 108, an in a particular example to the translator 118, without the virtual machine manager block 108 directly controlling or influencing the operation of the profiler.

In an example, the profiler can include profiling tools that can operate as components of the translator 118. Such profiling tools can monitor a virtual machine as the virtual machine is implemented on a host device, such as in the virtual machine manager block 108, and note which instructions, such as processes, function calls, and hardware interactions, the virtual machine utilizes. Alternatively, the profiles can be obtained from third party suppliers that have knowledge of the instruction set of the virtual machine. Such third party suppliers can include the author of the virtual machine, the operator of the virtual machine, or a third party that has separately profiled the virtual machine.

The translator 118 can utilize profiles of virtual machines to translate between different virtual machines. The translator 118 can translate between a first virtual machine, such as a virtual machine implemented on the first server 102, and a second virtual machine having a format that is incompatible with the format of the first virtual machine. The second virtual machine can be implemented on the second server 104. The translation between the first virtual machine and the second virtual machine can allow a user of the electronic device 116 to interact with the first virtual machine while utilizing software relating to the second virtual machine on the electronic device 116.

The translator 118 can identify a virtual machine format of an input from, for instance, the server 102 on the basis of known information relating to the virtual machine format. In an example, the virtual machine format of the input can include metadata related to the virtual machine format, such as a name and version number of the virtual machine format. Where the metadata is provided, a corresponding profile can be referenced and utilized. In an alternative example, the translator 118 can identify the virtual machine format of the input on the basis of recognizing instructions from the virtual machine format, such as subroutines, function calls and hardware interactions, and correlating the instructions with the particular virtual machine format.

In an example, during implementation of the first virtual machine to give a user access to and utilize a program on the first virtual machine, the translator 118 can note which function calls the first virtual machine is making. The translator 118 can map the function calls used by the first virtual machine to function calls in the second virtual machine format. The translator 118 can then translate the function calls into the second virtual machine format and send the function calls to the second virtual machine software operating on the electronic device 116. The second virtual machine software can thereby utilize or display the first virtual machine information. The translator 118 can further allow a user to interact with the first virtual machine via the second virtual machine software by translating from the second virtual machine format to the first virtual machine format for transmission to, for instance, the first server 102.

The translator 118 can make associations between the profiles of the virtual machines and virtual machine formats by inferring correlations or intersections between various functions. In an example, the translator 118 can draw equivalencies between arithmetic instructions of two virtual machines, mapping, for instance, between addition function calls of two different formats, subtraction function calls of two different formats, and so forth. The same principle can be applied across the instruction sets of various virtual machine formats.

Single instructions do not necessarily map to a single additional instruction. Rather, to the extent that one virtual machine format may incorporate one function that is unique and/or relatively complex, the one function may map to a combination of two or more functions of another virtual machine. In a simplified example, a function of a first virtual machine format that performs a series of mathematical operations can map to the various mathematical functions in a second virtual machine format that recreate the mathematical operations of the first virtual machine format.

The translator 118 can also be provided with a third-party relationship map between, for instance, function calls of various virtual machines. Such third party maps can be implemented by third party sources to map between related function calls of different virtual machines. The translator 118 can then translate between function calls of the various virtual machines of the third party map. Such third party maps can be generated without respect to the virtual machine manager block 108 and then loaded, for instance, into the translator 118.

In an example, the translator 118 can monitor how various processor operations, such as specific mathematical operations or processor behavior simulations, are executed in various environments or specific circumstances. As particular mathematical functions can be invoked in particular manners, those manners can be monitored and utilized by the translator 118. For instance, the order in which processor instructions are invoked and the number of threads a particular program uses can be noted and mapped between virtual machine formats. In an example, various virtual machine formats can be characterized and mapped through executing simulated workloads or, for instance, enterprise resource planning software with a profiler as noted above configured to develop the profile for each virtual machine format on the basis of the simulated workload.

In a further example, a profile of various virtual machine formats can be developed through the use of a call graph to chart how a same or similar program runs in the various virtual machine format. A call graph can represent relationships between how, for instance, functions or subroutines in a program make function calls with respect to one another. In various examples, each virtual machine format can produce a unique call graph that can be utilized as a profile for the virtual machine format or that can be utilized to generate a profile.

The profile can be further developed on the basis of hardware interactions between input/output devices on the system 100, such as the graphics module 110 and the network module 114, and the subject virtual machine. In an example, the timing and manner in which the virtual machine format interacts with the input/output device can provide profile information for the virtual machine format. The various profiling characteristics discussed herein can be combined with other characteristics of virtual machine formats that tend to distinguish the operation of the virtual machine formats to produce the profiles.

The use of the profiles by the translator 118 can be a static use, e.g., the profile for each virtual machine can be supplied to the translator 118 and the translator 118 utilizes the profile until the profile is updated or otherwise replaced. Alternatively, the translator 118 can utilize profiles dynamically. In such dynamic use cases, the translator 118 can incorporate the profile tool to profile a first virtual machine from, for instance, the server 102 as the translator 118 is receiving the input from the server 102. For instance, the translator 118 can receives a function call from a first virtual machine format that the translator 118 is unfamiliar with or that has not been mapped to a related function call in the second virtual machine format. The profile tool of the translator 118 can draw an equivalence from the first virtual machine function call to a function call in the second virtual machine, allowing the translator 118 to translate the function call to the second virtual machine.

The profile tool can draw the equivalence by noting similarities in operation or effect between the two function calls. In the above example related to mathematical functions, the profile tool can note that an otherwise unknown function call starts with two values and produces a product of the two values as an output. The profile tool can then infer that the otherwise unknown function is a multiplication function and map the newly profiled multiplication function to a multiplication function of the second virtual machine. The profile tool can update the profile of the first virtual machine based on the newly drawn equivalence.

The translator 118 can generate or be provided with profiles for a variety of virtual machines not necessarily limited to the virtual machines implemented on the servers 102, 104, 106 and on the electronic device 116. The translator 118 can draw equivalencies between aspects of the profiles in advance of translating between two particular ones of the virtual machines. The translator 118 can also draw equivalencies as previously un-mapped aspects of the profiles of the virtual machines are encountered, as described above.

Intermediate Virtual Machine

The translator 118 can translate between virtual machine formats in stages by utilizing an intermediate virtual machine format. In an example, a profile of one of the virtual machines implemented on the servers 102, 104, 106, can be mapped not with respect to one another but rather with respect to an intermediate virtual machine format. The use of the intermediate virtual machine format can provide a relatively more simple set of mapping relationships between profiles than circumstances where each format maps to every other format, as each external virtual machine format profile can map to a single profile, e.g., the intermediate virtual machine profile.

In an example, a first virtual machine is to be translated to a second virtual machine. If the first virtual machine calls an addition function, the translator 118 can translate the addition function of the first virtual machine to the addition function of the intermediate virtual machine. The translator 118 can then translate from the addition function of the intermediate virtual machine to the addition function of the second virtual machine. In such an example, the instructions of the first virtual machine do not have to be mapped directly to the instructions of the second virtual machine.

The intermediate virtual machine format can be a virtual machine format that is not utilized or not intended to be utilized to provide a virtual machine to a host device. Such an intermediate virtual machine format can be a proprietary virtual machine format. Alternatively, any one of the virtual machine formats that the virtual machine management block 108 has a profile can serve as the intermediate virtual machine format to which the other virtual machine formats are mapped.

The intermediate virtual machine format can further be utilized to provide nested security for the virtual machine manager block 108 and the electronic device 116. The second virtual machine manager 124 can operate as a nested virtual machine with respect to the first virtual machine manager 122, with the scope of the second virtual machine manager 124 limited by the first virtual machine manager 122. While the first virtual machine manager 122 can facilitate communication between the electronic device 116 and the servers 102, 104, 106 by way of the translator 118, the second virtual machine manger 124 can provide security tools to apply a security requirement to the intermediate virtual machine as translated, in the above example, from the first virtual machine.

In an example, the second virtual machine manager 124 can monitor the intermediate virtual machine as other virtual machine formats are translated to and from the intermediate virtual machine. The intermediate virtual machine format can include maps to known or suspected malicious code, such as a virus, spyware, a Trojan horse, or other computer contaminant. The security requirement can prohibit the use or storage of information that includes the malicious code. The security requirement can reject the use of only the malicious code, or can reject the use of a complete virtual machine format that has information that maps to the malicious code.

In the above example, a function call from an input in the first virtual machine format, such as from the server 102, can map to a function call in the intermediate virtual machine that corresponds to known or suspected malicious code. In such a case, the second virtual machine manager 124 can note the relationship between the input in the first virtual machine format and the malicious code function of the intermediate virtual machine and inhibit further processing by the virtual machine manager block 108 or storage in the memory module 112 of the input from the server 102.

Storage in the Memory Module

The memory mapping layer 120 can manage the storage, in the memory module 112, of information in various virtual machine formats. In the above example, the input to the virtual machine manger block 108 from the server 102 is in a first virtual machine format, and the translator 118 translates the input into the second virtual machine format. The memory mapping layer 120 can store information from the input in the memory module 112 in the first virtual machine format, notwithstanding that the translator 118 has or will translate the input into the second virtual machine format. Consequently, the virtual machine manager block 108 can provide the output to, for instance, the graphics module in the second virtual machine format while storing information from the input in the first virtual machine format in the memory module 112.

The virtual machine manger block 108 can retrieve information stored in the memory module 112 and translate the information from the virtual machine format that the information was stored to another virtual machine format. Consequently, information that was stored in the memory module 112 once may not need to be retransmitted for subsequent use by the virtual machine manager block 108 or the electronic device 116. However, for the electronic device 116 to utilize the information stored in the memory module 112, the virtual machine manager block 108 can translate the information from, for instance, the first virtual machine format that the information was transmitted to another virtual machine format according to the operations of the translator 118 described above. The other virtual machine format is not necessarily the virtual machine format that the information was translated into in the first instance. As a result, information, once stored and preserved in the memory module 112, can be translated into any virtual machine format that the information can be useful in.

Storage of the information in the format of the virtual machine that the information was first transmitted in can contribute to security isolation between and among virtual machine formats. A user of the virtual machine manager block 108 can use or transition between and among multiple virtual machine formats while retaining access to the original information stored in the memory module 112. To the extent that one virtual machine format becomes compromised or unavailable, the user can switch to utilizing another virtual machine format and continue to utilize the stored information.

Cloud Translation

Figure 2:
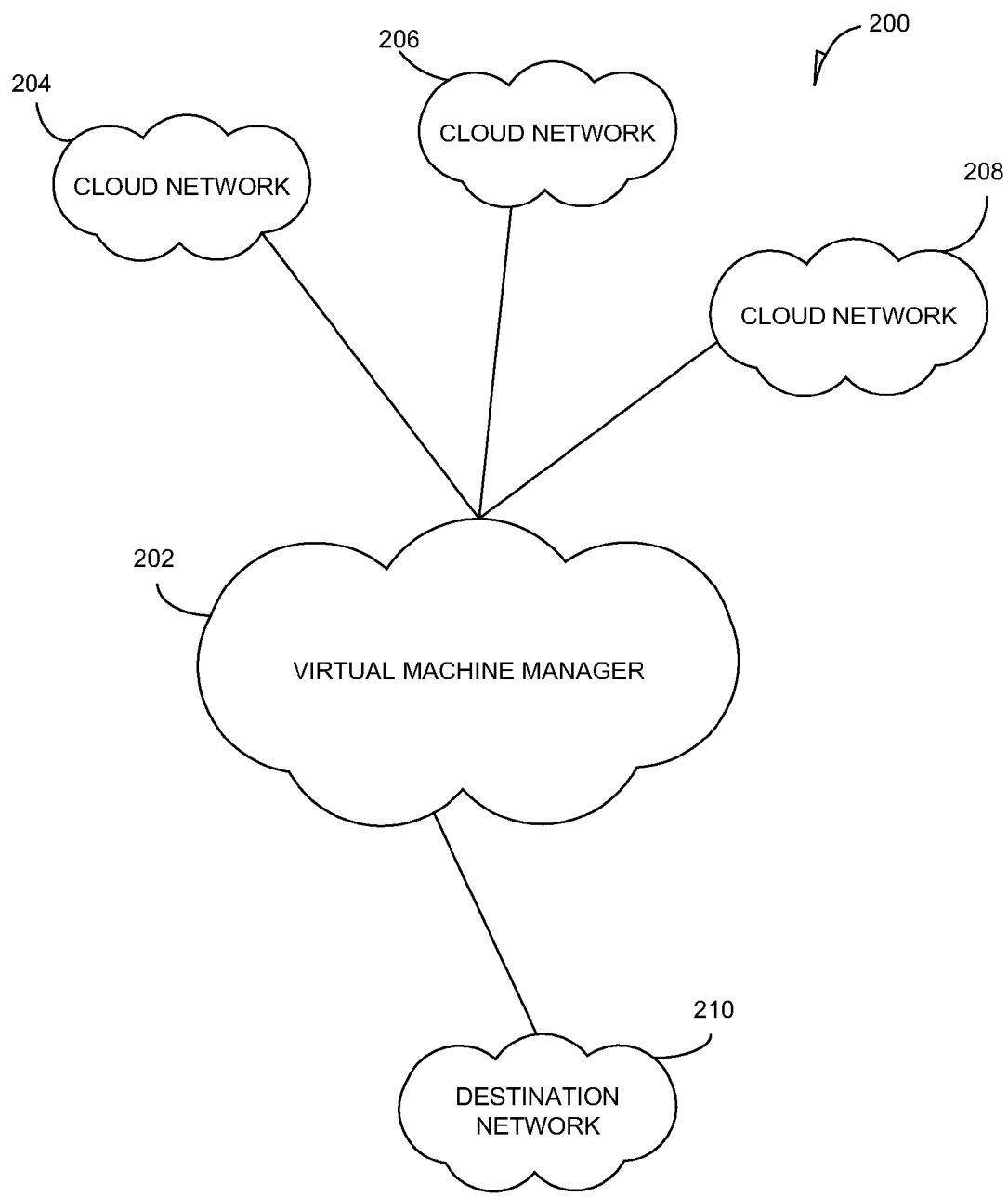
FIG. 2 is a block diagram of a system incorporating a virtual machine manager cloud, according to an embodiment.

FIG. 2 is a block diagram of a system 200 incorporating a virtual machine manager cloud 202. The functions of the virtual machine manager block 108 can be implemented as the virtual machine manager cloud 202. The functions of the translator 118, the memory mapping layer 120, the first virtual machine manager 122, and the second virtual machine manager 124 can be distributed, in whole or in part, between and among multiple processors and other hardware on multiple servers and other computing devices. In an example, processors incorporated by the various devices that make up the virtual machine manager cloud 202 can perform distributed processing to achieve the operability of the various layers 118, 120 and mangers 122, 124 of the virtual machine manager block 108.

As illustrated, the system 200 incorporates virtual machines implemented on various cloud networks 204, 206, 208. Cloud networks may also be referred to as cloud services. In alternative examples, the various cloud networks 204, 206, 208 can be individually replaced or supplemented by servers 102, 104, 106 implementing non-distributed virtual machines. The system 200 further includes at least one network 210 as a destination for information from the cloud networks 204, 206, 208. The network 210, and the devices included therein, can include the ability to display graphics, store information and communicate via network links, such as can be provided by the graphics module 110, the memory module 112, and the network module 114, respectively, of the electronic device 116.

In an example, the devices of the network 210 can interact with the virtual machines of the respective cloud networks 204, 206, 208 in a similar manner as the electronic device 116 interacts with the servers 102, 104, 106. In an example, the network 210 can be a cloud network, with devices communicatively coupled to the cloud network 210 enabled to interface with the cloud network 210 and the virtual machines of the cloud networks 204, 206, 208 according to the translation provided by the virtual machine manager cloud 202.

Example Methods

Figure 3:
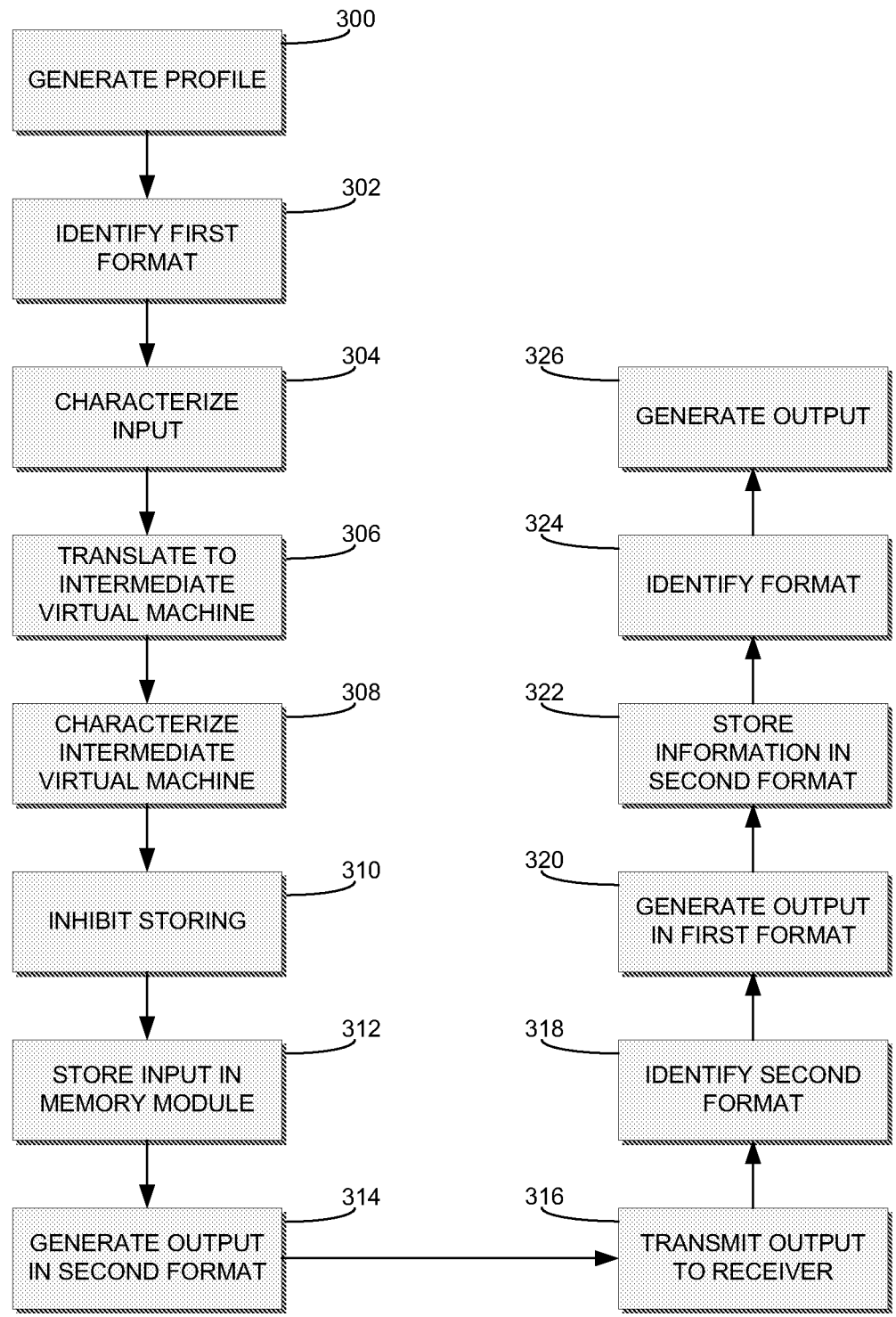
FIG. 3 is a flowchart illustrating a method for translating between virtual machines, according to an embodiment.

FIG. 3 is a flowchart illustrating a method for translating between virtual machines, according to an embodiment. It is noted that the flowchart of FIG. 3 can be applicable the electronic device 116, to the network 210, or to other devices and other networks. It is further noted that the various blocks of the flowchart can be performed in various orders depending on the circumstances of the implementation of the flowchart.

At block 300, a profile of a format of one of the plurality of virtual machines of the input from the server is generated, such as by a profiler as discussed above. In an example, the profile is based, at least in part, on a relationship between the format of the one of the plurality of virtual machines and another format of a different virtual machine. In an example, translating from the format of the one of the plurality of virtual machines to at least one of the first and second formats based on the profile.

In an example, each format of the plurality of virtual machines includes at least one instruction related to another format, the instruction configured to perform a similar task in each format.

In an example, the profile is generated based on the at least one instruction.

At block 302, an input in a first format of a first virtual machine is identified. In an example, input from the server includes metadata that identifies the input from the server as corresponding to the first format, and identifying the input is based on the metadata.

In an example, the first format of the first virtual machine and the second format of the second virtual machine each include a different instruction set. Each instruction set can include at least one of a process, a subroutine, a function call, and a hardware instruction. In an example, identifying the input is based on an identification of the instruction set as corresponding to the first format.

In an example, each instruction set includes a plurality of components. In an example, generating the output is based on a relationship between individual ones of the plurality of components of the instruction set corresponding to each of the first format and the second format.

At block 304, the input from the server is optionally characterized according to a security requirement.

At block 306, the input from the server is optionally translated to an intermediate virtual machine format.

At block 308, the input in the intermediate virtual machine format is utilized to characterize the input.

In an example, a plurality of virtual machines are implemented on the server, the plurality of virtual machines including the first and second virtual machines. In an example, the input from the server is in a format of one of the plurality of virtual machines.

At block 310, the memory manager is inhibited from storing information in the first or second format in the memory module that does not conform to the security requirement. Optionally, the memory manager is inhibited based on the input as translated into the intermediate virtual machine format. In an example, the information does not conform to the security requirement if the information includes a malicious software component.

At block 312, at least some of the information from the input is stored in a memory module, the stored input being in the first format. In an example, the information from the input is not stored in the memory module if the storing has been inhibited.

At block 314, an output, compatible with a second format of a second virtual machine, is generated based on the input. In an example, the second format is incompatible with the first format. In an example, at least some output comprises at least some of the input from the server translated into the second format of the second virtual machine.

At block 316, the output in the second format is transmitted to a receiver. In an example, the output is transmitted over a network to an electronic device. The electronic device can utilize the output via software for running a virtual machine having the second format.

At block 318, the second format of the second virtual machine is identified from data received from the server, the second virtual machine being implemented on the server.

At block 320, an output compatible with the first format of the first virtual machine is generated.

At block 322, information identified as corresponding to the second format is stored in the second format.

At block 324, the format of the one of the plurality of virtual machines of the input is identified.

At block 326, an output is generated. In an example, the output is compatible with a different format of another one of the plurality of virtual machines.

Examples, as described herein, can include, or can operate on, logic or a number of components, modules, or mechanisms. Modules are tangible entities (e.g., hardware) capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples that modules are temporarily configured in, each of the modules need not be instantiated at any one moment in time. For example, where the modules comprise a general-purpose hardware processor configured using software, the general-purpose hardware processor can be configured as respective different modules at different times. Software can accordingly configure a hardware processor, for example, to constitute a particular module at one instance of time and to constitute a different module at a different instance of time.

Embodiments can be implemented in one or a combination of hardware, firmware, and software. Embodiments can also be implemented as instructions stored on a computer-readable storage device, that can be read and executed by at least one processor to perform the operations described herein. A computer-readable storage device can include any non-transitory mechanism for storing information in a form readable by a machine (e.g., a computer). For example, a computer-readable storage device can include read-only memory (ROM), random-access memory (RAM), magnetic disk storage media, optical storage media, flash-memory devices, and other storage devices and media.

Figure 4:
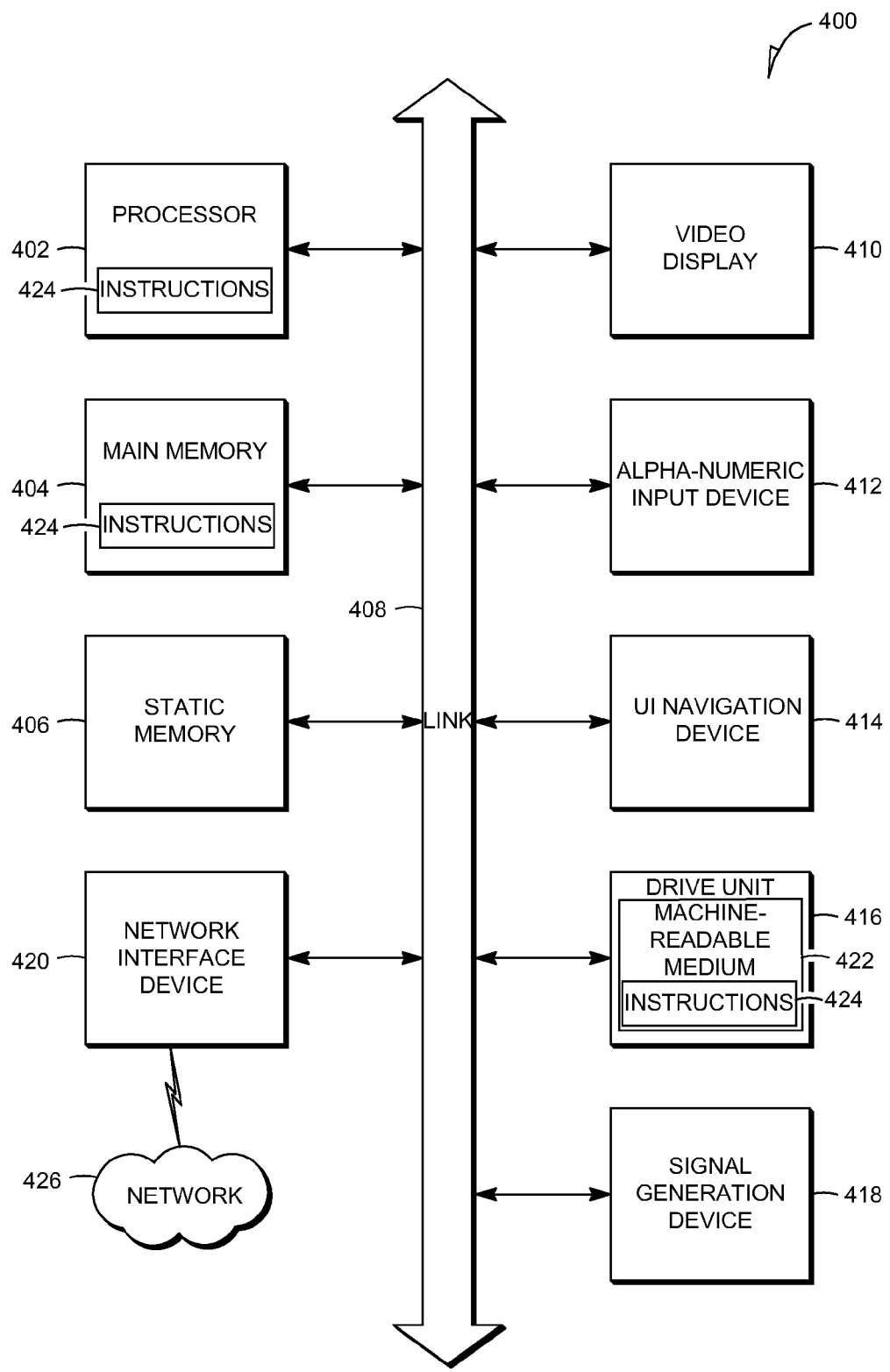
FIG. 4 is a block diagram illustrating a machine in the example form of a computer system, within which a set or sequence of instructions for causing the machine to perform any one of the methodologies discussed herein can be executed, according to an example embodiment.

FIG. 4 is a block diagram illustrating a machine in the example form of a computer system 400, within which a set or sequence of instructions for causing the machine to perform any one of the methodologies discussed herein can be executed, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 can further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 can additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 can also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" can include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

Additional Examples

In Example 1, a system for translating between virtual machines can optionally comprise a network adaptor communicatively coupled to a server, the server comprising a first virtual machine having a first format, the network adaptor to receive input from the server, and a translator, including a processor unit, the processor unit coupled to the network adapter. The translator can be configured to identify, from the input from the server, the first format of the first virtual machine and generate an output, compatible with a second format of a second virtual machine, based on the input from the server, the second format being incompatible with the first format. The system is configured to store at least some of the output in a memory modul.

In Example 2, a system of Example 1 optionally further comprises a virtual machine manager, the virtual machine manager comprising the translator and a memory manager to store information from the input and from the translator in the memory module. The virtual machine manager can be configured to transmit, to a receiver, the output in the second format, and store, in the memory module, at least some of the information from the input in the first format and at least some of the output from the translator in the second format.

In Example 3, a system of any one or more of Examples 1 or 2 can optionally include metadata in the input from the server, the metadata identifying the input from the server as corresponding to the first format. The translator can be configured to identify the input based on the metadata.

In Example 4, a system of any one or more of Examples 1-3 can optionally include that first format of the first virtual machine and the second format of the second virtual machine each comprise a different instruction set. The translator can be configured to identify the input based on an identification of the instruction set corresponding to the first format.

In Example 5, a system of any one or more of Examples 1-4 can optionally include that the instruction set comprises at least one of a process, a subroutine, a function call, and a hardware instruction.

In Example 6, a system of any one or more of Examples 1-5 can optionally include that each instruction set comprises a plurality of components, and that the translator is configured to generate the output based on a relationship between individual ones of the plurality of components of the instruction set corresponding to each of the first format and the second format.

In Example 7, a system of any one or more of Examples 1-6 can optionally include that the at least some of the output from the translator comprises at least some of the input from the server translated into the second format of the second virtual machine.

In Example 8, a system of any one or more of Examples 1-7 can optionally include that the second virtual machine is implemented on the server, that the translator is configured to identify, from data received from the server, the second format of the second virtual machine and generate an output compatible with the first format of the first virtual machine, and that the memory manager is configured to store in the memory module, in the first format, information identified by the translator as corresponding to the first format and to store, in the second format, information identified by the translator as corresponding to the second format.

In Example 9, a system of any one or more of Examples 1-8 can optionally include that the virtual machine manager is a first virtual machine manager. In an example, the system can further include a second virtual machine manager nested with respect to the first virtual machine manager, the second virtual machine manager configured to characterize the input from the server according to a security requirement and inhibit the memory manager from storing information in the first or second format in the memory module that does not conform to the security requirement.

In Example 10, a system of any one or more of Examples 1-9 can optionally include that the information does not conform to the security requirement if the information includes a malicious software component.

In Example 11, a system of any one or more of Examples 1-10 can optionally include that the second virtual machine manager is configured such that the translator is to translate the input from the server to an intermediate virtual machine format prior to characterizing the input and inhibiting the memory manager, and wherein the second virtual machine manager is configured to utilize the input as translated to the intermediate virtual machine format to characterize the input and inhibit the memory manager.

In Example 12, a system of any one or more of Examples 1-11 can optionally include that a plurality of virtual machines are implemented on the server, the plurality of virtual machines comprising the first and second virtual machines, wherein the input from the server is in a format of one of the plurality of virtual machines. The translator can be configured to identify, from the input from the server, the format of the one of the plurality of virtual machines of the input and generate an output, compatible with a different format of another one of the plurality of virtual machines. The virtual machine manager can include a profiler configured to generate a profile of a format of one of the plurality of virtual machines of the input from the server, the profile being based, at least in part, on a relationship between the format of the one of the plurality of virtual machines and another format of a different virtual machine. The translator can translate from the format of the one of the plurality of virtual machines to the different format based on the profile.

In Example 13, a system of any one or more of Examples 1-12 can optionally include that each format of the plurality of virtual machines includes at least one instruction related to another format, the instruction configured to perform a similar task in each format, and wherein the profiler generates the profile based on the at least one instruction.

In Example 14, a method can include identifying, from an input, the input in a first format of a first virtual machine, generating an output, compatible with a second format of a second virtual machine, based on the input, the second format being incompatible with the first format, and storing, in a memory module, at least some of the output.

In Example 15, a method of Example 14 can optionally further include transmitting, to a receiver, the output in the second format, and storing, in the memory module, at least some of the information from the input in the first format and at least some of the output in the second format.

In Example 16, a method of any one or more of Examples 14 and 15 can optionally include that the input from the server comprises metadata that identifies the input from the server as corresponding to the first format, and that identifying the input is based on the metadata.

In Example 17, a method of any one or more of Examples 14-16 can optionally include that the first format of the first virtual machine and the second format of the second virtual machine each comprise a different instruction set, each instruction set comprising at least one of a process, a subroutine, a function call, and a hardware instruction. In an example, identifying the input can be based on an identification of the instruction set as corresponding to the first format.

In Example 18, a method of any one or more of Examples 14-17 can optionally include that the instruction set includes at least one of a process, a subroutine, a function call, and a hardware instruction.

In Example 19, a method of any one or more of Examples 14-18 can optionally include that each instruction set comprises a plurality of components, and wherein generating the output is based on a relationship between individual ones of the plurality of components of the instruction set corresponding to each of the first format and the second format.

In Example 20, a method of any one or more of Examples 14-19 can optionally include that the at least some output comprises at least some of the input from the server translated into the second format of the second virtual machine.

In Example 21, a method of any one or more of Examples 14-20 can optionally include that the second virtual machine is implemented on the server. In an example, the method can further include identifying, from data received from the server, the second format of the second virtual machine, generating an output compatible with the first format of the first virtual machine, storing in the memory module, in the first format, information identified as corresponding to the first format, and storing, in the second format, information identified as corresponding to the second format.

In Example 22, a method of any one or more of Examples 14-21 can optionally further include characterizing the input from the server according to a security requirement, and inhibiting the memory manager from storing information in the first or second format in the memory module that does not conform to the security requirement.

In Example 23, a method of any one or more of Examples 14-22 can optionally include that the information does not conform to the security requirement if the information includes a malicious software component.

In Example 24, a method of any one or more of Examples 14-23 can optionally further include translating the input from the server to an intermediate virtual machine format and utilizing the input in the intermediate virtual machine format to characterize the input and inhibit the memory manager.

In Example 25, a method of any one or more of Examples 14-24 can optionally include that a plurality of virtual machines are implemented on the server, the plurality of virtual machines including the first and second virtual machines, wherein the input from the server is in a format of one of the plurality of virtual machines. In an example, the method can further comprise identifying, from the input from the server, the format of the one of the plurality of virtual machines of the input, generating an output, compatible with a different format of another one of the plurality of virtual machines, generating a profile of a format of one of the plurality of virtual machines of the input from the server, the profile being based, at least in part, on a relationship between the format of the one of the plurality of virtual machines and another format of a different virtual machine, and translating from the format of the one of the plurality of virtual machines to at least one of the first and second formats based on the profile.

In Example 26, a method of any one or more of Examples 14-25 can optionally include that each format of the plurality of virtual machines comprises at least one instruction related to another format, the instruction configured to perform a similar task in each format. In an example, the method can further include generating the profile based on the at least one instruction.

In Example 27, at least one computer readable storage medium can be communicatively coupled to a processor and comprise instructions which, when executed on the processor, cause the processor to perform the method of any one or more of Examples 14-26.

In the following description, reference is made to the accompanying drawings that form a part hereof, and in which is shown by way of illustration specific embodiments which can be practiced. These embodiments are described in sufficient detail to enable those skilled in the art to practice the invention, and it is to be understood that other embodiments can be utilized and that structural, logical and electrical changes can be made without departing from the scope of the present invention. The following description of example embodiments is, therefore, not to be taken in a limited sense, and the scope of the present invention is defined by the appended claims.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system for translating between virtual machines, comprising:
    a network adaptor communicatively coupled to a server, the server comprising a first virtual machine having a first format, the network adaptor to receive input from the server;
    a translator including a processor unit, the processor unit communicatively coupled to the network adapter and incorporating virtual machine profiles, each including documentation of an instruction set of a corresponding virtual machine format, the processor unit configured to:
        determine, from the input from the server, the first format of the first virtual machine based on a comparison of the input with a first virtual machine profile of the virtual machine profiles corresponding to the first format; and
        generate an output, compatible with a second format of a second virtual machine, based on the input from the server and a relationship between the first virtual machine profile and a second virtual machine profile of the virtual machine profiles, the second format being incompatible with the first format, wherein the first format of the first virtual machine and the second format of the second virtual machine each comprise a different instruction set;
    wherein the system is configured to store at least some of the output in a memory module.

2. The system of claim 1, further comprising a virtual machine manager, the virtual machine manager comprising:
    the translator; and
    a memory manager to store the virtual machine profiles and information from the input and from the translator in the memory module;
    wherein the virtual machine manager is configured to:
        transmit, to a receiver, the output in the second format; and
        store, in the memory module, at least some of the information from the input in the first format and at least some of the output from the translator in the second format.

3. The system claim 1, wherein the input from the server comprises metadata that identifies the input from the server as corresponding to the first format, and wherein the translator is configured to determine the first format based on the metadata.

4. The system of claim 1, wherein the at least some of the output from the translator comprises at least some of the input from the server translated into the second format of the second virtual machine.

5. The system of claim 1, wherein the second virtual machine is implemented on the server; and
    wherein the translator is configured to determine, from data received from the server, the second format of the second virtual machine and generate an output compatible with the first format of the first virtual machine; and
    wherein the memory manager is configured to store in the memory module, in the first format, information determined by the translator as corresponding to the first format and to store, in the second format, information determined by the translator as corresponding to the second format.

6. The system of claim 1, wherein the virtual machine manager is a first virtual machine manager, and further comprising:
    a second virtual machine manager nested with respect to the first virtual machine manager, the second virtual machine manager configured to:
        characterize the input from the server according to a security requirement; and
        inhibit the memory manager from storing information in the first or second format in the memory module that does not conform to the security requirement.

7. The system of claim 6, wherein the information does not conform to the security requirement if the information includes a malicious software component.

8. The system of claim 6, wherein the second virtual machine manager is configured such that the translator is to translate the input from the server to an intermediate virtual machine format prior to characterizing the input and inhibiting the memory manager, and wherein the second virtual machine manager is configured to utilize the input as translated to the intermediate virtual machine format to characterize the input and inhibit the memory manager.

9. The system of claim 1, wherein a plurality of virtual machines are implemented on the server, the plurality of virtual machines comprising the first and second virtual machines, wherein the input from the server is in a format of one of the plurality of virtual machines;
    wherein the translator is configured to:
        determine, from the input from the server, the format of the one of the plurality of virtual machines of the input based on a comparison of the input with the virtual machine profiles; and
        generate an output, compatible with a different format of another one of the plurality of virtual machines and based on a relationship between the virtual machine profile corresponding to the input and another one of the virtual machine profiles; and
    wherein the virtual machine manager includes a profiler configured to generate a profile of the virtual machine profiles based on of a format of one of the plurality of virtual machines of the input from the server, the profile being based, at least in part, on a relationship between the format of the one of the plurality of virtual machines and another format of a different virtual machine.

10. At least one non-transitory computer readable device, the computer readable storage device communicatively coupled to a processor and comprising instructions which, when executed on the processor, cause the processor to:
    determine, from an input from a server, the input in a first format of a first virtual machine based on a comparison of the input with a first virtual machine profile of a plurality of virtual machine profiles incorporated in the processor, the first virtual machine profile corresponding to the first format;
    generate an output, compatible with a second format of a second virtual machine, based on the input and a relationship between the first virtual machine profile and a second virtual machine profile of the virtual machine profiles, the second format being incompatible with the first format, wherein the first format of the first virtual machine and the second format of the second virtual machine each comprise a different instruction set, each instruction set comprising at least one of a process, a subroutine, a function call, or a hardware instruction;
    storing, in a memory module, at least some of the output.

11. The at least one computer readable storage device of claim 10, further comprising instructions which, when performed on the processor, cause the processor to:
    transmit, to a receiver, the output in the second format; and
    store, in a memory module, at least some of the information from the input in the first format and at least some of the output in the second format.

12. The at least one computer readable storage device of claim 10, wherein the input from the server comprises metadata that identifies the input from the server as corresponding to the first format, and wherein the instructions cause the processor to determine the first format based on the metadata.

13. The at least one computer readable storage device of claim 10, wherein the at least some of the output comprises at least some of the input from the server translated into the second format of the second virtual machine.

14. The at least one computer readable storage device of claim 10, wherein the second virtual machine is implemented on the server, and further comprising instructions which, when performed on the processor, cause the processor to:
    determine, from data received from the server, the second format of the second virtual machine and generate an output compatible with the first format of the first virtual machine; and
    store in the memory module, in the first format, information determined by the processor as corresponding to the first format and to store, in the second format, information determined by the translator as corresponding to the second format.

15. The at least one computer readable storage device of claim 10, further comprising instructions, nested with respect to the instructions that identify the first and second formats, generate the output, transmit the output, and store in a memory module, configured to:
    characterize the input from the server according to a security requirement; and
    inhibit the memory manager from storing information in the first or second format in the memory module that does not conform to the security requirement.

16. The at least one computer readable storage device of claim 15, wherein the information does not conform to the security requirement if the information includes a malicious software component.

17. The at least one computer readable storage device of claim 15, wherein the instructions cause the processor to:
    translate the input from the server to an intermediate virtual machine format; and
    utilize the input in the intermediate virtual machine format to characterize the input and inhibit the memory manager.

18. The at least one computer readable storage device of claim 10, wherein a plurality of virtual machines are implemented on the server, the plurality of virtual machines comprising the first and second virtual machines, wherein the input from the server is in a format of one of the plurality of virtual machines;
    wherein the instructions further cause the processor to:
        determine, from the input from the server, the format of the one of the plurality of virtual machines of the input based on a comparison of the input with the plurality of virtual machine profiles;
        generate an output, compatible with a different format of another one of the plurality of virtual machines and based on a relationship between the virtual machine profile corresponding to the input and another one of the plurality of virtual machine profiles;
        generate a profile of the plurality of virtual machine profiles based on a format of one of the plurality of virtual machines of the input from the server, the profile being based, at least in part, on a relationship between the format of the one of the plurality of virtual machines and another format of a different virtual machine.

19. A computer implemented method, comprising:
    determining, from an input from a server, the input in a first format of a first virtual machine based on a comparison of the input with a first virtual machine profile of a plurality of virtual machine profiles incorporated in the processor, the first virtual machine profile corresponding to the first format;
    generating an output, compatible with a second format of a second virtual machine, based on the input and a relationship between the first virtual machine profile and a second virtual machine profile of the virtual machine profiles, the second format being incompatible with the first format, wherein the first format of the first virtual machine and the second format of the second virtual machine each comprise a different instruction set, each instruction set comprising at least one of a process, a subroutine, a function call, or a hardware instruction; and storing, in a memory module, at least some of the output.

20. The method of claim 19, further comprising:

transmitting, to a receiver, the output in the second format; and storing, in a memory module, at least some of the information from the input in the first format; and wherein the output is stored in the second format.

21. The method of claim 19, wherein the input from the server comprises metadata that identifies the input from the server as corresponding to the first format, and wherein determining the first format is based on the metadata.

22. The method of claim 19, wherein the at least some output comprises at least some of the input from the server translated into the second format of the second virtual machine.

23. The method of claim 19, wherein the second virtual machine is implemented on the server, and further comprising:

determining, from data received from the server, the second format of the second virtual machine;

generating an output compatible with the first format of the first virtual machine;

storing in the memory module, in the first format, information determined as corresponding to the first format;

storing, in the second format, information determined as corresponding to the second format.

24. The method of claim 19, further comprising:

characterizing the input from the server according to a security requirement; and inhibiting the memory manager from storing information in the first or second format in the memory module that does not conform to the security requirement.

25. The method of claim 24, wherein the information does not conform to the security requirement if the information includes a malicious software component.

26. The method of claim 24, further comprising:

translating the input from the server to an intermediate virtual machine format; and utilizing the input in the intermediate virtual machine format to characterize the input and inhibit the memory manager.

27. The method of claim 19, wherein a plurality of virtual machines are implemented on the server, the plurality of virtual machines comprising the first and second virtual machines, wherein the input from the server is in a format of one of the plurality of virtual machines, and further comprising:

determining, from the input from the server, the format of the one of the plurality of virtual machines of the input based on a comparison of the input with the plurality of virtual machine profiles;

generating an output, compatible with a different format of another one of the plurality of virtual machines and based on a relationship between the virtual machine profile corresponding to the input and another one of the plurality of virtual machine profiles;

generating a profile of the plurality of virtual machine profiles based on a format of one of the plurality of virtual machines of the input from the server, the profile being based, at least in part, on a relationship between the format of the one of the plurality of virtual machines and another format of a different virtual machine.

28. The method of claim 19, wherein the plurality of virtual machine profiles each incorporate at least one of processes, subroutine, function calls, or hardware interactions of a corresponding virtual machine format.

29. The computer readable storage device of claim 10, wherein the plurality of virtual machine profiles each incorporate at least one of processes, subroutine, function calls, or hardware interactions of a corresponding virtual machine format.

30. The system of claim 1, wherein the virtual machine profiles each incorporate at least one of processes, subroutine, function calls, or hardware interactions of a corresponding virtual machine format.

* * * * *